US012780683B2

(12) United States Patent
Han et al.

(10) Patent No.: US 12,780,683 B2
(45) Date of Patent: Nov. 3, 2026

(54) POSITIVE ELECTRODE ACTIVE MATERIAL FOR LITHIUM SECONDARY BATTERY, METHOD FOR PREPARING THE SAME AND LITHIUM SECONDARY BATTERY COMPRISING THE SAME

(71) Applicant: LG Energy Solution, Ltd., Seoul (KR)

(72) Inventors: Gi-Beom Han, Daejeon (KR); Eun-Sol Lho, Daejeon (KR); Joong-Yeop Do, Daejeon (KR); Kang-Joon Park, Daejeon (KR); Min Kwak, Daejeon (KR); Sang-Min Park, Daejeon (KR); Dae-Jin Lee, Daejeon (KR); Sang-Wook Lee, Daejeon (KR); Wang-Mo Jung, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 728 days.

(21) Appl. No.: 18/038,525

(22) PCT Filed: Nov. 30, 2021

(86) PCT No.: PCT/KR2021/017926
§ 371 (c)(1),
(2) Date: May 24, 2023

(87) PCT Pub. No.: WO2022/114934
PCT Pub. Date: Jun. 2, 2022

(65) Prior Publication Data

US 2024/0018015 A1 Jan. 18, 2024

(30) Foreign Application Priority Data

Nov. 30, 2020 (KR) ........................ 10-2020-0164872

(51) Int. Cl.
*C01G 53/50* (2025.01)
*H01M 10/0525* (2010.01)

(52) U.S. Cl.
CPC ........ *C01G 53/50* (2013.01); *H01M 10/0525* (2013.01); *C01P 2004/61* (2013.01); *C01P 2006/12* (2013.01); *C01P 2006/40* (2013.01)

(58) Field of Classification Search
CPC .......................... H01M 10/0525; C01G 53/50; C01P 2004/61; C01P 2006/12; C01P 2006/40

(Continued)

(56) References Cited

U.S. PATENT DOCUMENTS

2002/0110736 A1 8/2002 Kweon et al.
2010/0327221 A1 12/2010 Koga et al.

(Continued)

FOREIGN PATENT DOCUMENTS

CN 1346160 A 4/2002
CN 104282903 A 1/2015

(Continued)

OTHER PUBLICATIONS

International Search Report for PCT/KR2021/017926 mailed Mar. 18, 2022. 4 pages.

(Continued)

*Primary Examiner* — James M Erwin
(74) *Attorney, Agent, or Firm* — Lerner David LLP

(57) ABSTRACT

A positive electrode active material having at least one secondary particle comprising an agglomerate of primary macro particles, a method for preparing the same and a lithium secondary battery comprising the same are provided. A positive electrode active material has improved capacity retention by controlling a BET change in an electrode rolling process.

18 Claims, 3 Drawing Sheets

(58) Field of Classification Search
USPC .................................................... 429/231.95
See application file for complete search history.

(56) References Cited

U.S. PATENT DOCUMENTS

| | | | | |
|---|---|---|---|---|
| 2012/0231351 | A1* | 9/2012 | Jung | H01M 4/131 429/223 |
| 2014/0178739 | A1 | 6/2014 | Jung | |
| 2015/0010819 | A1 | 1/2015 | Lee et al. | |
| 2015/0037678 | A1 | 2/2015 | Kwak et al. | |
| 2016/0013476 | A1 | 1/2016 | Oh et al. | |
| 2018/0323423 | A1* | 11/2018 | Kim | H01M 4/505 |
| 2019/0305300 | A1 | 10/2019 | Hashimoto | |
| 2020/0127287 | A1 | 4/2020 | Yamauchi et al. | |
| 2020/0161650 | A1 | 5/2020 | Park et al. | |
| 2020/0185712 | A1 | 6/2020 | Hiratsuka | |
| 2020/0365875 | A1* | 11/2020 | Choi | H01M 10/0525 |
| 2020/0388830 | A1 | 12/2020 | Lee et al. | |
| 2020/0388839 | A1* | 12/2020 | Min | H01M 4/505 |
| 2021/0005875 | A1 | 1/2021 | Lee et al. | |
| 2022/0020983 | A1 | 1/2022 | Lho et al. | |
| 2022/0037657 | A1 | 2/2022 | Matsumoto et al. | |

FOREIGN PATENT DOCUMENTS

| | | | |
|---|---|---|---|
| JP | 2009152214 | A | 7/2009 |
| JP | 2009176732 | A | 8/2009 |
| JP | 2015-018803 | A | 1/2015 |
| JP | 2018045802 | A | 3/2018 |
| JP | 2018073481 | A | 5/2018 |
| JP | 2019-175721 | A | 10/2019 |
| JP | 2022-510653 | A | 1/2022 |
| KR | 20020024521 | A | 3/2002 |
| KR | 20140081472 | A | 7/2014 |
| KR | 20150013077 | A | 2/2015 |
| KR | 101785262 | B1 | 10/2017 |
| KR | 20190059249 | A | 5/2019 |
| KR | 20190093453 | A | 8/2019 |
| KR | 20190139033 | A | 12/2019 |
| WO | 2019-044205 | A1 | 3/2019 |
| WO | 2020-066256 | A1 | 4/2020 |

OTHER PUBLICATIONS

Search Report dated Jul. 14, 2025 from the Office Action for Chinese Application No. 202180079633.4 issued Jul. 16, 2025. 2 pgs.

Hyeong Seop Kang: "Glass ceramic coating on LiNi0.8Co0.1Mn0.102 cathode for Li-ion batteries", Korean Journal of Chemical Engineering, vol. 37, No. 8, Aug. 1, 2020 (Aug. 1, 2020) , pp. 1331-1339, XP093156356, New York ISSN: 0256-1115, DOI: 10.1007/s11814-020-0570-x Retrieved from the Internet: URL: https://link.springer.com/article/10.1 007/s11814-020-0570-x/fulltext.html>.

Extended European Search Report including Written Opinion for Application No. 21898759.2 dated May 10, 2024. 7 pgs.

* cited by examiner

POSITIVE ELECTRODE ACTIVE MATERIAL FOR LITHIUM SECONDARY BATTERY, METHOD FOR PREPARING THE SAME AND LITHIUM SECONDARY BATTERY COMPRISING THE SAME

CROSS-REFERENCE TO RELATED APPLICATION(S)

The present application is a national phase entry under 35 U.S.C. § 371 of International Application No. PCT/KR2021/017926, filed on Nov. 30, 2021 which claims priority to Korean Patent Application No. 10-2020-0164872 filed on Nov. 30, 2020, in the Republic of Korea, the disclosures of which are incorporated herein by reference.

TECHNICAL FIELD

The present disclosure relates to a positive electrode active material for a lithium secondary battery comprising primary macro particles and a method for preparing the same.

BACKGROUND ART

Recently, with the widespread use of electronic devices using batteries, for example, mobile phones, laptop computers and electric vehicles, there is a fast growing demand for secondary batteries with small size, light weight and relatively high capacity. In particular, lithium secondary batteries are gaining attention as a power source for driving mobile devices due to their light weight and high energy density advantages. Accordingly, there are many efforts to improve the performance of lithium secondary batteries.

A lithium secondary battery includes an organic electrolyte solution or a polymer electrolyte solution filled between a positive electrode and a negative electrode made of an active material capable of intercalating and deintercalating lithium ions, and chemical energy is converted to electrical energy by oxidation and reduction reactions during intercalation/deintercalation of lithium ions at the positive electrode and the negative electrode.

The positive electrode active material of the lithium secondary battery includes lithium cobalt oxide ($LiCoO_2$), lithium nickel oxide ($LiNiO_2$), lithium manganese oxide ($LiMnO_2$ or $LiMn_2O_4$) and a lithium iron phosphate compound ($LiFePO_4$). Among them, lithium cobalt oxide ($LiCoO_2$) is widely used due to its high operating voltage and large capacity advantages, and is used as a positive electrode active material for high voltage. However, cobalt (Co) has a limitation on the use in a large amount as a power source in the field of electric vehicles due to its price rise and unstable supply, and thus there is a need for development of an alternative positive electrode active material. Accordingly, nickel cobalt manganese based lithium composite transition metal oxide (hereinafter simply referred to as 'NCM-based lithium composite transition metal oxide') with partial substitution of nickel (Ni) and manganese (Mn) for cobalt (Co) has been developed.

Meanwhile, the conventionally developed NCM-based lithium composite transition metal oxide is in the form of a secondary particle formed by agglomeration of primary micro particles, and has a large specific surface area and low particle strength. Additionally, when the positive electrode active material comprising the secondary particle formed by agglomeration of primary micro particles is used to manufacture an electrode, followed by a rolling process, particle cracking is severe and a large amount of gas is produced during the cell operation, resulting in low stability. In particular, high-Ni NCM-based lithium composite transition metal oxide having higher nickel (Ni) content to ensure high capacity has low structural and chemical stability and is more difficult to ensure thermal stability.

To solve the above-described problem, monoliths have been studied and developed. The monolith exists independently of the secondary particle, and refers to a particle having seemingly absent grain boundary. Compared to the secondary particle formed by agglomeration of primary micro particles, the monolith has lower BET and a smaller area of the surface reaction site and the consequential reduced side reactions with the electrolyte solution, which is beneficial for controlling the side reaction and ensuring stability. However, the monolith has an increase in resistance and a decrease in capacity retention in the presence of rock salt formed on the surface due to the BET reduction and sintering at high temperature.

DISCLOSURE

Technical Problem

The present disclosure is designed to solve the above-described problem, and therefore the present disclosure is directed to providing a positive electrode active material with improved capacity retention by controlling a BET change in a rolling process.

Accordingly, the present disclosure is directed to providing a nickel-based positive electrode active material with improved life characteristics by reducing particle cracking in the positive electrode active material in a rolling process.

Technical Solution

An aspect of the present disclosure provides a positive electrode active material.

Specifically, there is provided a positive electrode active material for a lithium secondary battery comprising at least one secondary particle comprising an agglomerate of primary macro particles, wherein an average particle size D50 of the primary macro particle is 1 μm or more, all or part of a surface of the secondary particle or the primary macro particle is coated with a lithium boron oxide, an average particle size D50 of the secondary particle is 3 to 6 μm, a specific surface area of the positive electrode active material before rolling an electrode comprising the positive electrode active material is 0.2 to 1.25 $m^2/g$, and a BET change of the positive electrode active material before/after the rolling of the electrode comprising the positive electrode active material is 70% or less, wherein a rolling condition of the electrode is a condition satisfying that a porosity of the electrode is 15 to 30%, and specifically 25%.

The BET change of the positive electrode active material before/after the rolling of the electrode comprising the positive electrode active material may be 50% or less.

A specific surface area of the positive electrode active material after the rolling may be 1.5 $m^2/g$ or less.

A ratio of particles of less than 1 μm in the positive electrode active material may be less than 5% in a PSD distribution of the collected positive electrode active material in the condition for satisfying that the porosity of the electrode is 15 to 30%.

The average particle size D50 of the primary macro particle may be 2 μm or more, and a ratio of the average particle size D50 of the primary macro particle/an average crystal size of the primary macro particle may be 2 or more.

In the positive electrode active material, the primary macro particle may be separated from the secondary particle during the rolling, and the separated primary macro particle itself may not crack.

An average crystal size of the primary macro particle may be 150 nm or more.

A ratio of the average particle size D50 of the secondary particle/the average particle size D50 of the primary macro particle may be 2 to 4 times.

The positive electrode active material may comprise a nickel-based lithium transition metal oxide.

The nickel-based lithium transition metal oxide may comprise $Li_{(1+a)}Ni_{(1-(a+x+y+w))}Co_xM1_yM2_wO_2$, wherein $0 \leq a \leq 0.5$, $0 \leq x \leq 0.35$, $0 \leq y \leq 0.35$, $0 \leq w \leq 0.1$, $0 \leq a+x+y+w \leq 0.7$, M1 is at least one selected from the group consisting of Mn and Al, and M2 is at least one selected from the group consisting of Ba, Ca, Zr, Ti, Mg, Ta, Nb and Mo.

A boron content of the lithium boron oxide may be 0.05 to 0.2 mass % based on the total weight of the positive electrode active material.

An aspect of the present disclosure provides a positive electrode for a lithium secondary battery comprising the positive electrode active material.

An aspect of the present disclosure provides a lithium secondary battery comprising the positive electrode active material.

An aspect of the present disclosure provides a method for preparing a positive electrode active material according to the following embodiment.

There is provided a method for preparing a positive electrode active material for a lithium secondary battery comprising (S1) synthesizing a precursor comprising nickel, cobalt and manganese through coprecipitation reaction; (S2) mixing the precursor comprising the nickel, the cobalt and the manganese with a lithium raw material and doping elements and performing thermal treatment to prepare a nickel-based lithium transition metal oxide; and (S3) mixing the nickel-based lithium transition metal oxide with a boron compound and performing thermal treatment to coat a surface of the nickel-based lithium transition metal oxide with a lithium boron oxide, wherein the positive electrode active material comprises at least one secondary particle comprising an agglomerate of 10 or less primary macro particles, an average particle size D50 of the primary macro particle is 1 μm or more, all or part of a surface of the secondary particle or the primary macro particle Is coated with the lithium boron oxide, an average particle size D50 of the secondary particle is 3 to 15 μm, a specific surface area of the positive electrode active material before rolling is 0.2 to 1.25 $m^2/g$, and a BET change of the positive electrode active material before/after the rolling is 70% or less.

The step (S1) may be performed at pH 7 to pH 10, the step (S2) may be performed at 800 to 900° C., and the step (S3) may be performed at 300 to 400° C.

The boron compound may comprise at least one selected from the group consisting of $B(OH)_3$, $B_2O_3$, $H_3BO_3$, $B_2O_5$, $LiBO_3$, $Li_2B_4O_7$ and $Na_2B_4O_7$.

The step (S1) may be performed in a pH 7 to pH 10 condition.

Advantageous Effects

According to an embodiment of the present disclosure, it is possible to provide a positive electrode active material with improved capacity retention by controlling a BET change in the rolling process.

According to an embodiment of the present disclosure, it is possible to provide a positive electrode active material with greatly improved life characteristics by controlling the sintering temperature and coating at least part of the surface of the secondary particle to significantly reduce particle cracking or fine particle formation in the rolling process.

DESCRIPTION OF DRAWINGS

The accompanying drawings illustrate the preferred embodiment of the present disclosure, and together with the above description, serve to help a further understanding of the technical aspects of the present disclosure, so the present disclosure should not be construed as being limited to the drawings. Meanwhile, the shape, size, scale or proportion of the elements in the drawings of the specification may be exaggerated to emphasize a more clear description.

BEST MODE

Figure 1:
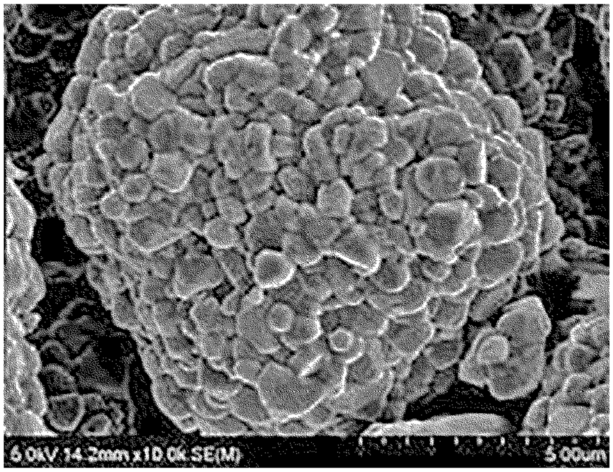
FIG. 1 is a scanning electron microscopy (SEM) image of a secondary particle comprising primary micro particles.

Hereinafter, embodiments of the present disclosure will be described in detail. Prior to the description, it should be understood that the terms or words used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the disclosure of the embodiments described herein is just a most preferred embodiment of the present disclosure, but not intended to fully describe the technical aspects of the present disclosure, so it should be understood that a variety of other equivalents and modifications could have been made thereto at the time that the application was filed.

Unless the context clearly indicates otherwise, it will be understood that the term "comprises" when used in this specification, specifies the presence of stated elements, but does not preclude the presence or addition of one or more other elements.

In the specification and the appended claims, "comprising multiple crystal grains" refers to a crystal structure formed by two or more crystal grains having a specific range of average crystal sizes. In this instance, the crystal size of the crystal grain may be quantitatively analyzed using X-ray diffraction analysis (XRD) by Cu Kα X-ray (X-ray). Specifically, the average crystal size of the crystal grain may be quantitatively analyzed by putting a prepared particle into a holder and analyzing diffraction grating for X-ray radiation onto the particle. Sampling is performed by putting a sample in a groove at the center of a common holder for powder and leveling the surface using a slide glass such that the height is equal to the holder edge. The sample is measured using Bruker D8 Endeavor (Cu Kα, λ=1.54° Å) equipped with LynxEye XE-T position sensitive detector with the step size of 0.02° in the scan range of 90° FDS 0.5°, 2-theta 15°, to make the total scan time of ~20 min. Rietveld refinement of the measured data is performed, considering the charge at each site (metals at transition metal site +3, Ni at Li site +2) and cation mixing. In crystal size analysis, instrumental broadening is considered using Fundamental Parameter Approach (FPA) implemented in Bruker TOPAS program, and in fitting, all peaks in the measurement range are used. The peak shape fitting is only performed using Lorentzian contribution to First Principle (FP) among peak types available in TOPAS, and in this instance, strain is not considered. The structure is analyzed through the above-described method, and the average crystal size of the crystal grain may be quantitatively analyzed.

In the specification and the appended claims, D50 may be defined as a particle size at 50% of particle size distribution, and may be measured using a laser diffraction method. For example, a method for measuring the average particle size D50 of a positive electrode active material may include dispersing particles of the positive electrode active material in a dispersion medium, introducing into a commercially available laser diffraction particle size measurement device (for example, Microtrac MT 3000), irradiating ultrasound of about 28 kHz with the output power of 60 W, and calculating the average particle size D50 corresponding to 50% of cumulative volume in the measurement device.

In the present disclosure, 'primary particle' refers to a particle having seemingly absent grain boundary when observed with the field of view of 5000 to 20000 magnification using a scanning electron microscope. In the present disclosure, the primary particle may be classified into a primary micro particle and a primary macro particle according to the average particle size D50.

In the present disclosure, 'secondary particle' is a particle formed by agglomeration of the primary particles.

In the present disclosure, 'monolith' refers to a particle that exists independently of the secondary particle, and has seemingly absent grain boundary, and for example, it is a particle having the particle diameter of 0.5 μm or more.

In the present disclosure, 'particle' may include any one of the monolith, the secondary particle and the primary particle or all of them.

Positive Electrode Active Material

An aspect of the present disclosure provides a positive electrode active material in the form of a secondary particle of different type from the conventional art.

Specifically, there is provided a positive electrode active material for a lithium secondary battery 1) comprising at least one secondary particle comprising an agglomerate of primary macro particles, 2) wherein the average particle size D50 of the primary macro particle is 1 μm or more, 3) all or part of the surface of the secondary particle is coated with lithium boron oxide, 4) the average particle size D50 of the secondary particle is 3 to 15 μm, and the specific surface area of the positive electrode active material before the rolling process of an electrode comprising the positive electrode active material is 0.2 to 1.25 $m^2/g$, and in the rolling process of the electrode comprising the positive electrode active material, a BET change of the positive electrode active material before/after the rolling is 70% or less.

(In this instance, the rolling condition of the electrode is a condition satisfying that the porosity of the electrode is 15 to 30%)

The secondary particle having the above-described features may provide a nickel-based positive electrode active material with improved life characteristics.

Hereinafter, the above-described features 1) to 5) of the secondary particle will be described in detail.

Particle Shape and Primary Macro Particle

In general, nickel-based lithium transition metal oxide is a secondary particle. The secondary particle may be an agglomerate of primary particles.

Specifically, a secondary particle of dense nickel-based lithium transition metal hydroxide prepared by a coprecipitation method is used for a precursor, and when the precursor is mixed with a lithium precursor and sintered at the temperature of less than 960° C., a secondary particle of nickel-based lithium transition metal oxide may be obtained. The conventional secondary particle is shown in FIG. 1. However, when a positive electrode active material comprising the conventional secondary particle is coated on a current collector, followed by a rolling process, the particle itself cracks, and the specific surface area increases. When the specific surface area increases, side reactions with the electrolyte increases.

Figure 2:
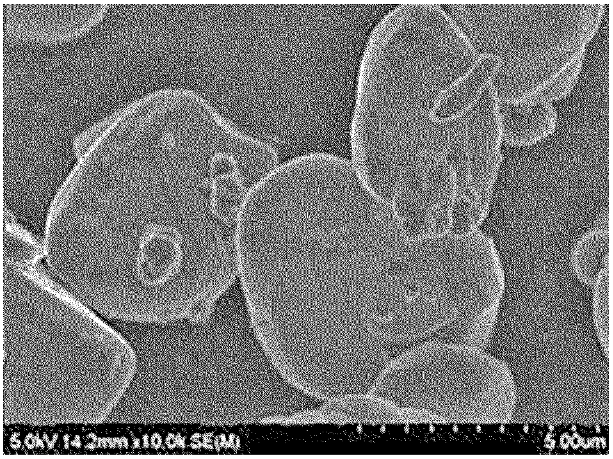
FIG. 2 is an SEM image of a monolith.

To solve this problem, monolithic positive electrode active materials have been additionally developed. Specifically, monolithic nickel-based lithium transition metal oxide that is not present in the form of a secondary particle any longer may be obtained by increasing the sintering temperature compared to the conventional positive electrode material synthesis condition. The monolithic positive electrode active material is shown in FIG. 2. However, since the monolith has a very smaller surface area than the conventional secondary particle, the reaction area reduces, causing increased resistance. Additionally, as the particle size of the monolith increases, the distance for diffusion of lithium ions increases, causing increased diffusion resistance.

An aspect of the present disclosure is provided to solve the problem.

In case that sintering is only performed at higher sintering temperature using the dense precursor like the conventional art, the average particle size D50 of the primary particle increases, and at the same time, the average particle size D50 of the secondary particle increases as well. However, as mentioned above, when the surface and diffusion resistance problem occurs, it is necessary to control in a manner of reducing the degree of monolithization by slightly lowering the sintering temperature. In this case, the size of the primary particle decreases and the growth of the secondary particle decreases as well, and it is difficult to control the size of the secondary particle and the size of the primary particle at the same time.

In contrast, the secondary particle according to an aspect of the present disclosure is different from the method for obtaining the conventional monolith as described below.

As described above, the conventional monoliths are formed at higher primary sintering temperature, but still use the conventional precursor for secondary particles. In contrast, the secondary particle according to an aspect of the present disclosure uses a porous precursor. When the porosity is high, even if the sintering temperature is increased for monolithization, the growth of the primary particle may be limited, and at the same time, the growth of the secondary particle may be also limited. When comparing the monolithization condition of sintering the conventional precursors for secondary particles at higher sintering temperatures, in the similar sintering condition, the size of the secondary particle may be controlled to the similar level but the size of the primary particle may be smaller than the conventional monolith. Accordingly, it is possible to prepare a positive electrode material with higher BET and lower surface resistance and diffusion resistance than the conventional monolith.

Figure 3:
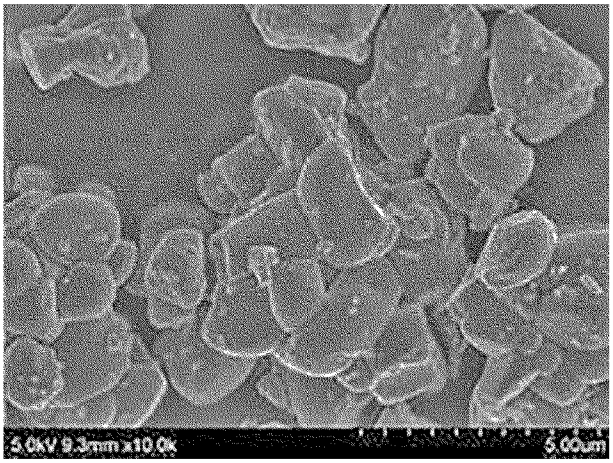
FIG. 3 is an SEM image of a secondary particle comprising primary macro particles.

Accordingly, the secondary particle according to an aspect of the present disclosure has the equal or similar average particle size D50 to the conventional secondary particle and a large average particle size D50 of the primary particle. That is, as opposed to the typical configuration of the conventional positive electrode active material, i.e., in the form of a secondary particle formed by agglomeration of primary particles having a small average particle size, it is provided a secondary particle formed by agglomeration of primary macro particles, namely, primary particles having the increased size. The monolithic positive electrode active material is shown in FIG. 3.

In the present disclosure, the 'primary macro particle' has the average particle size D50 of 1 μm or more.

In a specific embodiment of the present disclosure, the average particle size of the primary macro particle may be 1 μm or more, 1.5 μm or more, 2 μm or more, 2.5 μm or more, 3 μm or more, or 3.5 μm or more, and may be 5 μm or less, 4.5 μm or less, or 4 μm or less. When the average particle size of the primary macro particle is less than 1 μm, a secondary particle formed by agglomeration of the primary macro particles corresponds to the conventional secondary micro particle, and particle cracking may occur in the rolling process.

In the present disclosure, the 'primary macro particle' may have a ratio of the average particle size D50/the average crystal size of 3 or more. That is, when compared with the primary micro particle that forms the conventional secondary particle, the primary macro particle has simultaneous growth of the average particle size and the average crystal size of the primary particle.

That is, in the present disclosure, the primary macro particle refers to a particle having a large average particle size as well as a large average crystal size and a seemingly absent grain boundary.

As described above, compared to the conventional monolith, the "secondary micro particle formed by agglomeration of primary macro particles" used in an aspect of the present disclosure is advantageous in terms of the increased BET, the reduced primary particle size, and the consequential reduced surface resistance and internal diffusion resistance.

In this instance, the average crystal size of the primary macro particle may be quantitatively analyzed using X-ray diffraction analysis (XRD) by Cu Kα X-ray. Specifically, the average crystal size of the primary macro particle may be quantitatively analyzed by putting the prepared particle into a holder and analyzing diffraction grating for X-ray radiation onto the particle. Sampling is performed by putting a sample in a groove at the center of a common holder for powder and leveling the surface using a slide glass such that the height is equal to the holder edge. The sample is measured using Bruker D8 Endeavor (Cu Kα, λ=1.54° Å) equipped with LynxEye XE-T position sensitive detector with the step size of 0.02° in the scan range of 90° FDS 0.5°, 2-theta 15°, to make the total scan time of ~20 min. Rietveld refinement of the measured data is performed, considering the charge at each site (metals at transition metal site +3, Ni at Li site +2) and cation mixing. In crystal size analysis, instrumental broadening is considered using Fundamental Parameter Approach (FPA) implemented in Bruker TOPAS program, and in fitting, all peaks in the measurement range are used. The peak shape fitting is only performed using Lorentzian contribution to First Principle (FP) among peak types available in TOPAS, and in this instance, strain is not considered. The structure is analyzed through the above-described method, and the average crystal size of the crystal grain may be quantitatively analyzed.

In a specific embodiment of the present disclosure, the ratio of the average particle size D50/the average crystal size may be 2 or more, 2.5 or more, or 3 or more, and may be 50 or less, 40 or less, or 35 or less.

Additionally, the average crystal size of the primary macro particle may be 150 nm or more, 170 nm or more, or 200 nm or more, and may be 300 nm or less, 270 nm or less, or 250 nm or less.

Secondary Particle

The secondary particle according to an aspect of the present disclosure has the equal or similar average particle size D50 to the conventional art and a large average particle size D50 of the primary particle. That is, as opposed to the typical configuration of the conventional positive electrode active material, i.e., in the form of a secondary particle formed by agglomeration of primary particles having a small average particle size, there is provided a secondary particle formed by agglomeration of primary macro particles, namely, primary particles having the increased size.

In a specific embodiment of the present disclosure, the secondary particle may be an agglomerate of 1 to 10 primary macro particles. More specifically, the secondary particle may be an agglomerate of 1 or more, 2 or more, 3 or more, or 4 or more primary macro particles in the numerical range, and may be an agglomerate of 10 or less, 9 or less, 8 or less, or 7 or less primary macro particles in the numerical range.

The secondary particle according to an aspect of the present disclosure has the average particle size D50 of 3 μm to 6 jim. More specifically, the average particle size D50 is 3 μm or more, 3.5 μm or more, 4 μm or more, or 4.5 μm or more, and is 6 μm or less, 5.5 μm or less, or 5 μm or less.

In general, no matter what particle type, at the same composition, the particle size and the average crystal size in the particle increase with the increasing sintering temperature. In contrast, in the secondary micro particle according to an aspect of the present disclosure, the primary macro particle having a large particle size may be grown in the similar sintering condition to the conventional monolith synthesis using the porous precursor, and the secondary micro particle may be controlled to the equivalent level to the conventional art.

Accordingly, the secondary particle according to an aspect of the present disclosure has the equal or similar average particle size D50 to the conventional secondary particle and comprises primary macro particles having a larger average particle size and a larger average crystal size than the conventional primary micro particle.

In a specific embodiment of the present disclosure, a ratio of the average particle size D50 of the secondary particle/the average particle size D50 of the primary macro particle may be 2 to 4 times.

Meanwhile, in the present disclosure, the specific surface area of the positive electrode active material before rolling of the electrode comprising the positive electrode active material is 0.2 to 1.25 $m^2/g$, A BET change of the positive electrode active material before/after rolling of the electrode comprising the positive electrode active material is 70% or less, and more specifically 50% or less.

The inventors found that even the secondary particle according to the present disclosure changes in capacity retention depending on BET (specific surface area). That is, it can be seen that in an aspect of the present disclosure, in the case of a material having a large BET change before/after rolling, the surface of the positive electrode active material in which the lithium boron oxide is not processed during rolling is exposed in the rolling process and side reactions with the electrolyte solution get severe. Additionally, it can be seen that the electrochemical performance degrades due to the mechanical contact between the secondary particles. To reduce the BET change, the present disclosure coats all or at least part of the secondary particle with lithium boron oxide. The lithium boron oxide is formed by mixing a boron compound such as $B(OH)_3$, $B_2O_3$, $H_3BO_3$, $B_2O_5$, $LiBO_3$, $Li_2B_4O_7$, $Na_2B_4O_7$ with the positive electrode active material and sintering under an oxygen atmosphere, and the lithium boron oxide is the result of reaction between lithium impurities remaining on the positive electrode active material and the boron compound under the oxygen atmosphere. The boron content of the lithium boron oxide may be 0.05 to 0.2 mass % based on the total weight of the positive electrode active material.

Meanwhile, the inventors also found that the capacity retention changes by the generation of PSD fine particles. That is, in an aspect of the present disclosure, it can be seen that in the case of a material having a large PSD change before/after rolling, the surface of the positive electrode active material in which the boron compound is not processed is exposed during rolling and side reactions with the electrolyte solution get severe. Additionally, it can be seen that the electrochemical performance degrades due to the mechanical contact between the secondary particles. The present disclosure provides the positive electrode active material with a low PSD change by controlling the sintering temperature and coating at least part of the surface of the secondary particle to reduce the PSD change.

Accordingly, the positive electrode active material is prepared by rolling the positive electrode active material coated with lithium boron oxide such that the porosity is at the level of 15% to 30%, and fine particles of 1 μm or less after the rolling may be less than 5%, more specifically less than 2.5%, and the most specifically less than 2%.

In this instance, the primary macro particle is separated but does not crack itself in the rolling process of the secondary particle. In this instance, the rolling condition may be a condition satisfying that the porosity of the electrode is at the level of 15% to 30%. More specifically, the rolling condition may be a condition satisfying that the porosity of the electrode is 25%.

Composition

The secondary particle comprises nickel-based lithium transition metal oxide.

In this instance, the nickel-based lithium transition metal oxide may comprise $Li_{(1+a)}Ni_{(1-(a+x+y+w))}Cp_xM1_yM2_wO_2$, wherein $0 \le a \le 0.5$, $0 \le x \le 0.35$, $0 \le y \le 0.35$, $0 \le w \le 0.1$, $0 \le a+x+y+w \le 0.7$, M1 is at least one selected from the group consisting of Mn and Al, and M2 is at least one selected from the group consisting of Ba, Ca, Zr, Ti, Mg, Ta, Nb and Mo).

In the above formula, a, x, y and w denote a mole ratio of each element in the nickel-based lithium transition metal oxide.

In this instance, the doped metal M1 and M2 in the crystal lattice of the secondary particle may be disposed on the surface of only a part of the particle depending on the position preference of M1 and/or M2, and may be positioned with a concentration gradient that decreases in a direction from the particle surface to the center of the particle, or may be uniformly positioned over the entire particle.

When the secondary particle is doped with or coated and doped with metal M1 and M2, in particular, the long life characteristics of the active material may be further improved by surface structure stabilization.

Positive Electrode and Lithium Secondary Battery

According to another embodiment of the present disclosure, there are provided a positive electrode for a lithium secondary battery comprising the positive electrode active material, and a lithium secondary battery.

Specifically, the positive electrode comprises a positive electrode current collector and a positive electrode active material layer comprising the positive electrode active material, formed on the positive electrode current collector.

In the positive electrode, the positive electrode current collector is not limited to a particular type and may include any type of material having conductive properties without causing any chemical change to the battery, for example, stainless steel, aluminum, nickel, titanium, sintered carbon or aluminum or stainless steel treated with carbon, nickel, titanium or silver on the surface. Additionally, the positive electrode current collector may be generally 3 to 500 μm in thickness, and may have microtexture on the surface to improve the adhesion strength of the positive electrode active material. For example, the positive electrode current collector may come in various forms, for example, films, sheets, foils, nets, porous bodies, foams and non-woven fabrics.

In addition to the above-described positive electrode active material, the positive electrode active material layer may comprise a conductive material and a binder.

In this instance, the conductive material is used to impart conductivity to the electrode, and may include, without limitation, any type of conductive material having the ability to conduct electrons without causing any chemical change to the battery. Specific examples of the conductive material may include at least one of graphite, for example, natural graphite or artificial graphite; carbon-based materials, for example, carbon black, acetylene black, ketjen black, channel black, furnace black, lamp black, thermal black and carbon fibers; metal powder or metal fibers, for example, copper, nickel, aluminum and silver; conductive whiskers, for example, zinc oxide and potassium titanate; conductive metal oxide, for example, titanium oxide; or conductive polymers, for example, polyphenylene derivatives. In general, the conductive material may be included in an amount of 1 to 30 weight % based on the total weight of the positive electrode active material layer.

Additionally, the binder serves to improve the bonds between the positive electrode active material particles and the adhesion strength between the positive electrode active material and the positive electrode current collector. Specific examples of the binder may include at least one of polyvinylidene fluoride (PVDF), polyvinylidene fluoride-hexafluoropropylene copolymer (PVDF-co-HFP), polyvinylalcohol, polyacrylonitrile, carboxymethylcellulose (CMC), starch, hydroxypropyl cellulose, regenerated cellulose, polyvinylpyrrolidone, polytetrafluoroethylene, polyethylene, polypropylene, ethylene-propylene-diene polymer (EPDM), sulfonated-EPDM, styrene butadiene rubber (SBR), fluoro rubber, or a variety of copolymers thereof. The binder may be included in an amount of 1 to 30 weight % based on the total weight of the positive electrode active material layer.

The positive electrode may be manufactured by the commonly used positive electrode manufacturing method except using the above-described positive electrode active material. Specifically, the positive electrode may be manufactured by coating a positive electrode active material layer forming composition comprising the positive electrode active material and optionally, the binder and the conductive material on the positive electrode current collector, drying and rolling. In this instance, the type and amount of the positive electrode active material, the binder and the conductive material may be the same as described above.

The solvent may include solvents commonly used in the corresponding technical field, for example, at least one of dimethyl sulfoxide (DMSO), isopropyl alcohol, N-methylpyrrolidone (NMP), acetone or water. The solvent may be used in such an amount to have sufficient viscosity for good thickness uniformity when dissolving or dispersing the positive electrode active material, the conductive material and the binder and coating to manufacture the positive electrode in view of the slurry coating thickness and the production yield.

Alternatively, the positive electrode may be manufactured by casting the positive electrode active material layer forming composition on a support, peeling off a film from the support and laminating the film on the positive electrode current collector.

According to still another embodiment of the present disclosure, there is provided an electrochemical device comprising the positive electrode. Specifically, the electrochemical device may include a battery or a capacitor, and more specifically, a lithium secondary battery.

Specifically, the lithium secondary battery comprises a positive electrode, a negative electrode disposed opposite the positive electrode, a separator interposed between the positive electrode and the negative electrode and an electrolyte, and the positive electrode is the same as described above. Additionally, optionally, the lithium secondary battery may further comprise a battery case in which an electrode assembly comprising the positive electrode, the negative electrode and the separator is received, and a sealing member to seal up the battery case.

In the lithium secondary battery, the negative electrode comprises a negative electrode current collector and a negative electrode active material layer positioned on the negative electrode current collector.

The negative electrode current collector may include any type of material having high conductivity without causing any chemical change to the battery, for example, copper, stainless steel, aluminum, nickel, titanium, sintered carbon, copper or stainless steel treated with carbon, nickel, titanium or silver on the surface and an aluminum-cadmium alloy, but is not limited thereto. Additionally, the negative electrode current collector may be generally 3 to 500 μm in thickness, and in the same way as the positive electrode current collector, the negative electrode current collector may have microtexture on the surface to improve the bonding strength of the negative electrode active material. For example, the negative electrode current collector may come in various forms, for example, films, sheets, foils, nets, porous bodies, foams and non-woven fabrics.

In addition to the negative electrode active material, the negative electrode active material layer optionally comprises a binder and a conductive material. For example, the negative electrode active material layer may be made by coating a negative electrode forming composition comprising the negative electrode active material, and optionally the binder and the conductive material on the negative electrode current collector and drying, or by casting the negative electrode forming composition on a support, peeling off a film from the support and laminating the film on the negative electrode current collector.

The negative electrode active material may include compounds capable of reversibly intercalating and deintercalating lithium. Specific examples of the negative electrode active material may include at least one of a carbonaceous material, for example, artificial graphite, natural graphite, graphitizing carbon fibers, amorphous carbon; a metallic compound that can form alloys with lithium, for example, Si, Al, Sn, Pb, Zn, Bi, In, Mg, Ga, Cd, Si alloy, Sn alloy or Al alloy; metal oxide capable of doping and undoping lithium such as $SiO_\beta$ ($0<\beta<2$), $SnO_2$, vanadium oxide, lithium vanadium oxide; or a complex comprising the metallic compound and the carbonaceous material such as a Si—C complex or a Sn—C complex. Additionally, a metal lithium thin film may be used for the negative electrode active material. Additionally, the carbon material may include low crystalline carbon and high crystalline carbon. The low crystalline carbon typically includes soft carbon and hard carbon, and the high crystalline carbon typically includes high temperature sintered carbon, for example, amorphous, platy, flaky, spherical or fibrous natural graphite or artificial graphite, Kish graphite, pyrolytic carbon, mesophase pitch based carbon fiber, meso-carbon microbeads, mesophase pitches and petroleum or coal tar pitch derived cokes.

Additionally, the binder and the conductive material may be the same as those of the above-described positive electrode.

Meanwhile, in the lithium secondary battery, the separator separates the negative electrode from the positive electrode and provides a passage for movement of lithium ions, and may include, without limitation, any separator commonly used in lithium secondary batteries, and in particular, preferably the separator may have low resistance to the electrolyte ion movement and good electrolyte solution wettability. Specifically, the separator may include, for example, a porous polymer film made of polyolefin-based polymer such as ethylene homopolymer, propylene homopolymer, ethylene/butene copolymer, ethylene/hexene copolymer and ethylene/methacrylate copolymer or a stack of two or more porous polymer films. Additionally, the separator may include common porous non-woven fabrics, for example, nonwoven fabrics made of high melting point glass fibers and polyethylene terephthalate fibers. Additionally, to ensure the heat resistance or mechanical strength, the coated separator comprising ceramics or polymer materials may be used, and may be selectively used with a single layer or multilayer structure.

Additionally, the electrolyte used in the present disclosure may include an organic liquid electrolyte, an inorganic liquid electrolyte, a solid polymer electrolyte, a gel polymer electrolyte, a solid inorganic electrolyte and a molten inorganic electrolyte, available in the manufacture of lithium secondary batteries, but is not limited thereto.

Specifically, the electrolyte may comprise an organic solvent and a lithium salt.

The organic solvent may include, without limitation, any type of organic solvent that acts as a medium for the movement of ions involved in the electrochemical reaction of the battery. Specifically, the organic solvent may include an ester-based solvent, for example, methyl acetate, ethyl acetate, γ-butyrolactone, ε-caprolactone; an ether-based solvent, for example, dibutyl ether or tetrahydrofuran; a ketone-based solvent, for example, cyclohexanone; an aromatic hydrocarbon-based solvent, for example, benzene, fluorobenzene; a carbonate-based solvent, for example, dimethylcarbonate (DMC), diethylcarbonate (DEC), ethylmethylcarbonate (EMC), ethylene carbonate (EC), propylene carbonate (PC); an alcohol-based solvent, for example, ethylalcohol, isopropyl alcohol; nitriles of R—CN (R is C2 to C20 straight-chain, branched-chain or cyclic hydrocarbon, and may comprise an exocyclic double bond or ether bond); amides, for example, dimethylformamide; dioxolanes, for example, 1,3-dioxolane; or sulfolanes. Among them, the carbonate-based solvent is desirable, and more preferably, cyclic carbonate (for example, ethylene carbonate or propylene carbonate) having high dielectric constant which contributes to the improved charge/discharge performance of the battery may be mixed with a linear carbonate-based compound (for example, ethylmethyl carbonate, dimethyl carbonate or diethyl carbonate) of low viscosity. In this case, the cyclic carbonate and the chain carbonate may be mixed at a volume ratio of about 1:1 to about 1:9 to improve the performance of the electrolyte solution.

The lithium salt may include, without limitation, any compound that can provide lithium ions used in lithium secondary batteries. Specifically, the lithium salt may include $LiPF_6$, $LiClO_4$, $LiAsF_6$, $LiBF_4$, $LiSbF_6$, $LiAlO_4$, $LiA_1Cl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$. The concentration of the lithium salt may range from 0.1 to 2.0 M. When the concentration of the lithium salt is included in the above-described range, the electrolyte has the optimal conductivity and viscosity, resulting in good performance of the electrolyte and effective movement of lithium ions.

In addition to the above-described constituent substances of the electrolyte, the electrolyte may further comprise, for example, at least one type of additive of a haloalkylene carbonate-based compound such as difluoro ethylene carbonate, pyridine, triethylphosphite, triethanolamine, cyclic ether, ethylene diamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol or aluminum trichloride to improve the life characteristics of the battery, prevent the capacity fading of the battery and improve the discharge capacity of the battery. In this instance, the additive may be included in an amount of 0.1 to 5 weight % based on the total weight of the electrolyte.

The lithium secondary battery comprising the positive electrode active material according to the present disclosure is useful in the field of mobile devices including mobile phones, laptop computers and digital cameras, and electric vehicles including hybrid electric vehicles (HEVs).

Accordingly, according to another embodiment of the present disclosure, there are provided a battery module comprising the lithium secondary battery as a unit cell and a battery pack comprising the same.

The battery module or the battery pack may be used as a power source of at least one medium-large scale device of power tools; electric vehicles comprising electric vehicles (EVs), hybrid electric vehicles, and plug-in hybrid electric vehicles (PHEVs); or energy storage systems.

Hereinafter, the embodiments of the present disclosure will be described in sufficiently detail for those having ordinary skill in the technical field pertaining to the present disclosure to easily practice the present disclosure. However, the present disclosure may be embodied in many different forms and is not limited to the disclosed embodiments.

Example 1

4 liters of distilled water was put into a coprecipitation reactor (capacity 20 L), and after the addition of 100 mL of 28 wt % ammonia aqueous solution while maintaining the temperature at 50° C., a transition metal solution having a concentration of 3.2 mol/L, in which $NiSO_4$, $CoSO_4$ and $MnSO_4$ were mixed a mole ratio of nickel:cobalt:manganese of 0.8:0.1:0.1 and 28 wt % ammonia aqueous solution were continuously introduced into the reactor at the rate of 300 mL/hr and 42 mL/hr, respectively. Stirring was performed at the impeller speed of 400 rpm, and the pH was maintained at 9 using 40 wt % sodium hydroxide solution. Precursor particles were formed by 10-hour coprecipitation reaction. The precursor particles were separated, washed and dried in an oven of 130° C. to prepare a precursor.

The $Ni_{0.8}Co_{0.1}Mn_{0.1}(OH)_2$ precursor synthesized by coprecipitation reaction was mixed with $Li_2CO_3$ at a Li/Me (Ni, Co, Mn) mole ratio of 1.05, and thermally treated at 850° C. for 10 hours in an oxygen atmosphere to prepare a positive electrode active material of $LiNi_{0.8}Co_{0.1}Mn_{0.1}O_2$ lithium composite transition metal oxide.

The prepared positive electrode active material of lithium composite transition metal oxide was mixed with $H_3BO_3$ as a boron compound and thermally treated at 400° C. for 10 hours in an air atmosphere to prepare the surface-coated positive electrode active material. The amount of $H_3BO_3$ is 1% by mass of the positive electrode active material of lithium composite transition metal oxide.

Example 2

In example 2, a positive electrode active material was prepared by the same method as example 1 except that the amount of $H_3BO_3$ is adjusted to 0.5% by mass of the positive electrode active material of lithium composite transition metal oxide.

Comparative Example 1

In comparative example 1, a positive electrode active material was prepared by the same method as example 1 except that the thermal treatment temperature was lowered down to 830° C. in the preparation of lithium composite transition metal oxide. In this case, the secondary particle of the present disclosure was not formed.

Comparative Example 2

In comparative example 2, a positive electrode active material was prepared by the same method as example 1 without $H_3BO_3$ coating.

Experimental Example 1: Comparison of BET Change After Rolling as a Function of Composition In the present disclosure, the BET change after electrode rolling was measured by the following method.

Each positive electrode active material prepared in example and comparative example, a carbon black conductive material and a PVdF binder were mixed in an N-methylpyrrolidone solvent at a weight ratio of 96:2:2 to prepare a positive electrode slurry, and the positive electrode slurry was coated on one surface of an aluminum current collector, and dried at 100° C. to manufacture a positive electrode before rolling. A positive electrode after rolling was manufactured by rolling the electrode such that the porosity is 25%.

The prepared positive electrode before rolling and the prepared positive electrode after rolling was thermally treated in a 500° C. air condition for 10 hours to remove the binder and the conductive material. Subsequently, the remaining positive electrode active material powder was collected to measure the particle size distribution, and the measurement results were shown in the following Table 1.

As can be seen from Table 1, it was found that in the case of example 1 with higher thermal treatment temperature than comparative example 1, the BET change was as small as 50%, and in the case of example 2 in which the amount of $H_3BO_3$ was reduced by half, the BET change was 70% which was lower than comparative example 1. Additionally, it can be seen that compared to example 1, comparative example 2 without coating shows a large BET change of 110%, and thus with high sintering thermal treatment temperature and coating, the BET change was small.

TABLE 1

| BET ($m^2/g$) | Example 1 | Example 2 | Comparative example 1 | Comparative example 2 |
|---|---|---|---|---|
| Before rolling | 0.6 (100%) | 0.7 (100%) | 1.0 (100%) | 1.1 (100%) |
| After rolling | 0.9 (150%) | 1.2 (170%) | 1.9 (190%) | 2.3 (210%) |

Experimental Example 2: Comparison of Residual Capacity in 30 Charge/Discharge Cycles as a Function of Composition A positive electrode was manufactured by the same method as experimental example 1 using the positive electrode active material according to examples 1 and 2 and comparative examples 1 and 2 and the capacity retention was measured by the following method.

Lithium metal was used for a negative electrode.

An electrode assembly including the positive electrode and the negative electrode manufactured as described above and a porous polyethylene separator between the positive electrode and the negative electrode was made and placed in a case, and an electrolyte solution was injected into the case to manufacture a lithium secondary battery. In this instance, the electrolyte solution was prepared by dissolving 1.0 M lithiumhexafluorophosphate ($LiPF_6$) in an organic solvent comprising ethylenecarbonate/ethylmethylcarbonate/diethylcarbonate/(a mix volume ratio of EC/EMC/DEC=3/4/3).

The manufactured lithium secondary battery half cell was charged at 0.7 C, 45° C. in CC-CV mode until 4.4V, and discharged at 0.5 C constant current until 3.0V, and capacity retention in 30 cycles of charge/discharge test was measured to evaluate the life characteristics. The results are shown in the following Table 2.

TABLE 2

| | Example 1 | Example 2 | Comparative example 1 | Comparative example 2 |
|---|---|---|---|---|
| Capacity retention(%)(after 30 charge/ discharge cycles) | 95 | 94 | 91 | 84 |

In experimental example 2, in the case of comparative example 2 with the BET change of 110%, the capacity retention in 30 charge/discharge cycles was at the level of 84%, while in the case of comparative example 1 with the BET change of 90%, the capacity retention was 91%, and in the case of example 2 and example 1 with the BET change of 70% and 50%, the capacity retention was 94% and 95%, respectively, and accordingly it can be seen that as the BET change according to experimental example 1 was lower, the charge/discharge capacity retention is better.

Experimental Example 3: Ratio of Presence of Fine Particles of Less Than 1 μm in Roll-Pressed Positive Electrode as a Function of Composition In the same way as experimental example 1, a positive electrode was manufactured, and the manufactured positive electrode was thermally treated in a 500° C. air condition for 10 hours to remove the binder and the conductive material. Subsequently, the remaining positive electrode active material powder was collected to measure the particle size distribution, and the results were shown in the following Table 3.

TABLE 3

| PSD | Example 1 | Example 2 | Comparative example 1 |
|---|---|---|---|
| Ratio of particles of less than 1 μm after rolling to 25% porosity (%) | 1.5 | 2.3 | 13.4 |

As can be seen from Table 3, it was found that in the case of examples 1 and 2 with higher thermal treatment temperature than comparative example 1, the ratio of particles of less than 1 μm was as low as 1.5% and 2.3%, respectively. As can be seen in experimental examples 1-3, it was found that when the BET change before/after rolling was 70% or less and the ratio of particles of less than 1 μm after rolling was less than 5%, the capacity retention was good.

What is claimed is:

1. A positive electrode active material for a lithium secondary battery, comprising:
- at least one secondary particle comprising an agglomerate of primary macro particles,
- wherein an average particle size (D50) of the primary macro particle is 1 μm or more,
- all or part of a surface of the secondary particle or the primary macro particle is coated with a lithium boron oxide,
- an average particle size (D50) of the secondary particle is from 3 to 15 μm,
- a specific surface area of the positive electrode active material before rolling an electrode comprising the positive electrode active material is from 0.2 to 1.25 $m^2/g$, and
- a BET change of the positive electrode active material before/after the rolling of the electrode comprising the positive electrode active material is 70% or less, wherein a rolling condition of the electrode is a condition satisfying that a porosity of the electrode is at from 15% to 30%,
- wherein a ratio of particles of less than 1 μm in the positive electrode active material is less than 5% in a PSD distribution of the collected positive electrode active material in the condition for satisfying that the porosity of the electrode is at from 15% to 30%.

2. The positive electrode active material for a lithium secondary battery according to claim 1, wherein the BET change of the positive electrode active material before/after the rolling of the electrode comprising the positive electrode active material is 50% or less.

3. The positive electrode active material for a lithium secondary battery according to claim 1, wherein a specific surface area of the positive electrode active material after the rolling is 1.5 $m^2/g$ or less.

4. The positive electrode active material for a lithium secondary battery according to claim 1, wherein the average particle size (D50) of the primary macro particle is 2 μm or more, and a ratio of the average particle size (D50) of the primary macro particle/an average crystal size of the primary macro particle is 2 or more.

5. The positive electrode active material for a lithium secondary battery according to claim 1, wherein in the positive electrode active material, the primary macro particle is separated from the secondary particle during the rolling to form separated primary macro particle, and the separated primary macro particle itself does not crack.

6. The positive electrode active material for a lithium secondary battery according to claim 1, wherein an average crystal size of the primary macro particle is 150 nm or more.

7. The positive electrode active material for a lithium secondary battery according to claim 1, wherein a ratio of the average particle size (D50) of the secondary particle/the average particle size (D50) of the primary macro particle is 2 to 4 times.

8. The positive electrode active material for a lithium secondary battery according to claim 1, wherein the positive electrode active material comprises a nickel-based lithium transition metal oxide.

9. The positive electrode active material for a lithium secondary battery according to claim 8, wherein the nickel-based lithium transition metal oxide comprises $Li_{(1+a)}Ni_{(1-(a+x+y+w))}Co_xM1_yM2_wO_2$, wherein $0 \leq a \leq 0.5$, $0 \leq x \leq 0.35$, $0 \leq y \leq 0.35$, $0 \leq w \leq 0.1$, $0 \leq a+x+y+w \leq 0.7$, M1 is at least one selected from the group consisting of Mn and Al, and M2 is at least one selected from the group consisting of Ba, Ca, Zr, Ti, Mg, Ta, Nb and Mo.

10. The positive electrode active material for a lithium secondary battery according to claim 1, wherein a boron content of the lithium boron oxide is 0.05 to 0.2 mass % based on the total weight of the positive electrode active material.

11. A positive electrode for a lithium secondary battery comprising the positive electrode active material according to claim 1.

12. A lithium secondary battery comprising the positive electrode active material according to claim 1.

13. A method for preparing a positive electrode active material for a lithium secondary battery, comprising:

(S1) synthesizing a precursor comprising nickel, cobalt and manganese through coprecipitation reaction;

(S2) mixing the precursor comprising the nickel, the cobalt and the manganese with a lithium raw material and doping elements and performing thermal treatment to prepare a nickel-based lithium transition metal oxide; and (S3) mixing the nickel-based lithium transition metal oxide with a boron compound and performing thermal treatment to coat a surface of the nickel-based lithium transition metal oxide with a lithium boron oxide, wherein the positive electrode active material comprises at least one secondary particle comprising an agglomerate of primary macro particles, an average particle size (D50) of the primary macro particle is 1 μm or more, all or part of a surface of the secondary particle or the primary macro particle is coated with the lithium boron oxide, an average particle size (D50) of the secondary particle is 3 to 15 μm, a specific surface area of the positive electrode active material before rolling is 0.2 to 1.25 $m^2/g$, and a BET change of the positive electrode active material before/after the rolling is 70% or less, wherein a rolling condition of an electrode is a condition satisfying a porosity of the electrode at from 15% to 30%, wherein the synthesizing the precursor is performed at pH 7 to pH 10, and the treatment to prepare the nickel-based lithium transition metal oxide is performed at 800 to 900° C., and the thermal treatment to coat the surface of the nickel-based lithium transition metal oxide with the lithium boron oxide is performed at 300 to 400° C.

14. The method for preparing a positive electrode active material according to claim 13, wherein the boron compound comprises at least one of $B(OH)_3$, $B_2O_3$, $H_3BO_3$, $B_2O_5$, $LiBO_3$, $Li_2B_4O_7$ or $Na_2B_4O_7$.

15. The method for preparing a positive electrode active material according to claim 13, wherein the synthesizing the precursor) is performed in a pH 7 to pH 10 condition.

16. A positive electrode active material for a lithium secondary battery, comprising:

at least one secondary particle comprising an agglomerate of primary macro particles, wherein an average particle size (D50) of the primary macro particle is 1 μm or more, all or part of a surface of the secondary particle or the primary macro particle is coated with a lithium boron oxide, an average particle size (D50) of the secondary particle is from 3 to 15 μm, a specific surface area of the positive electrode active material before rolling an electrode comprising the positive electrode active material is from 0.2 to 1.25 $m^2/g$, and a BET change of the positive electrode active material before/after the rolling of the electrode comprising the positive electrode active material is 70% or less, wherein a rolling condition of the electrode is a condition satisfying that a porosity of the electrode is at from 15% to 30%, wherein an average crystal size of the primary macro particle is 150 nm or more.

17. The positive electrode active material for a lithium secondary battery according to claim 16, wherein the average particle size (D50) of the primary macro particle is 2 μm or more, and a ratio of the average particle size (D50) of the primary macro particle/an average crystal size of the primary macro particle is 2 or more.

18. The positive electrode active material for a lithium secondary battery according to claim 16, wherein a specific surface area of the positive electrode active material after the rolling is 1.5 $m^2/g$ or less.

* * * * *